US011073995B2

(12) United States Patent
Breslow

(10) Patent No.: US 11,073,995 B2
(45) Date of Patent: *Jul. 27, 2021

(54) IMPLEMENTING SCALABLE MEMORY ALLOCATION USING IDENTIFIERS THAT RETURN A SUCCINCT POINTER REPRESENTATION

(71) Applicant: Advanced Micro Devices, Inc., Santa Clara, CA (US)

(72) Inventor: Alexander Dodd Breslow, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,064

(22) Filed: Apr. 14, 2020

(65) Prior Publication Data

US 2020/0241775 A1 Jul. 30, 2020

Related U.S. Application Data

(63) Continuation of application No. 16/111,560, filed on Aug. 24, 2018, now Pat. No. 10,628,063.

(51) Int. Cl.
*G06F 3/06* (2006.01)
*G06F 12/1018* (2016.01)

(52) U.S. Cl.
CPC .......... *G06F 3/0631* (2013.01); *G06F 3/0604* (2013.01); *G06F 3/0673* (2013.01); *G06F 12/1018* (2013.01); *G06F 2212/1044* (2013.01); *G06F 2212/657* (2013.01)

(58) Field of Classification Search
CPC ............ G06F 12/0864; G06F 16/2255; G06F 2212/1044; G06F 3/0611; G06F 12/023; G06F 16/9014; G06F 3/0631; G06F 3/0604; G06F 3/0673; G06F 12/1018; G06F 2212/657
See application file for complete search history.

(56) References Cited

U.S. PATENT DOCUMENTS

| 9,710,397 | B2 | 7/2017 | Macko |
| 2010/0011028 | A1 | 1/2010 | Dade |
| 2010/0082648 | A1 | 4/2010 | Potapov |
| 2012/0136846 | A1 | 5/2012 | Song |

(Continued)

OTHER PUBLICATIONS

Knowlton, Kenneth C.; A Fast Storage Allocator; Communications of the ACM, 8(10); vol. 8, No. 10; pp. 623-624; Oct. 1965.

(Continued)

*Primary Examiner* — Charles Rones
*Assistant Examiner* — Hewy H Li
(74) *Attorney, Agent, or Firm* — Faegre Drinker Biddle & Reath LLP

(57) ABSTRACT

A method and device generates a slab identifier and a hash function identifier in response to a memory allocation request with a request identifier and allocation size from a memory allocation requestor. The slab identifier indicates a memory region associated with a base data size and the hash function identifier indicates a hash function. The method and device provides a bit string including the slab identifier and the hash function identifier to the memory allocation requestor.

20 Claims, 7 Drawing Sheets

(56) References Cited

U.S. PATENT DOCUMENTS

| | | | |
|---|---|---|---|
| 2015/0052309 A1* | 2/2015 | Philip | G06F 12/082 |
| | | | 711/128 |
| 2017/0062025 A1 | 3/2017 | Kim | |
| 2017/0300592 A1 | 10/2017 | Breslow et al. | |
| 2017/0344475 A1 | 11/2017 | Subrahmanyam | |
| 2019/0340120 A1 | 11/2019 | Gokita | |
| 2020/0065012 A1 | 2/2020 | Breslow | |

OTHER PUBLICATIONS

Bonwick, Jeff; The Slab Allocator: An Object-Caching Kernel Memory Allocator; USENIX summer (vol. 16); Jun. 1994.

Berger, Emery D. et al.; Hoard: A Scalable Memory Allocator for Multithreaded Applications; ACM SIGARCH Computer Architecture News (vol. 28, No. 5, pp. 117-128); Nov. 2000.

Steinberger, Markus et al.; Scatteralloc: Massively Parallel Dynamic Memory Allocation for the GPU; Innovative Parallel Computing (InPar); (pp. 1-10); IEEE; May 2012.

Evans, Jason; A Scalable Concurrent malloc (3) Implementation for FreeBSD; BSDCan Conference, Ottawa, Canada; Apr. 2006.

Ghemawat, Sanjay et al.; TCMalloc: Thread-Caching Malloc; from http://pages.cs.wisc.edu/~danb/google-perftools-0.98/tcmalloc.html; Feb. 24, 2007.

Breslow, Alex D. et al.; Horton Tables: Fast Hash Tables for In-Memory Data-Intensive Computing; USENIX Annual Technical Conference; pp. 281-294; Jun. 2016.

Jacobson, Guy; Space-efficient Static Trees and Graphs; SFCS '89 Proceedings of the 30th Annual Symposium on Foundations of Computer Science; pp. 549-554; Nov. 1, 1989.

Pandey, Prashant et al.; A General-Purpose Counting Filter: Making Every Bit Count; 2017 ACM International Conference on Management of Data; pp. 775-787; May 2017.

Fan, Bin et al.; IMemC3: Compact and Concurrent MemCache with Dumber Caching and Smarter Hashing; NSDI; vol. 13; pp. 371-384; Apr. 2013.

Knuth, D.E.; The Art of Computer Programming: Sorting and Searching; vol. 3; Addison Wesley; Section 6.5 exercise 13; 1973.

* cited by examiner

IMPLEMENTING SCALABLE MEMORY ALLOCATION USING IDENTIFIERS THAT RETURN A SUCCINCT POINTER REPRESENTATION

RELATED APPLICATIONS

This application is a continuation application of U.S. application Ser. No. 16/111,560, filed on Aug. 24, 2018, having inventor Alexander Dodd Breslow, titled "IMPLEMENTING SCALABLE MEMORY ALLOCATION USING IDENTIFIERS THAT RETURN A SUCCINCT POINTER REPRESENTATION", which is owned by instant Assignee and is incorporated herein by reference.

BACKGROUND OF THE DISCLOSURE

Modern high-performance processors store information and use pointers to retrieve the stored information. For example, processors, such as a central processing unit (CPU) and/car a graphics processing unit (GPU), may execute tasks, applications, and/car computer programs using memory (e.g., device memory and/or processor memory). While executing an application, such as a mobile application, processors may store information within memory and return a pointer back to the mobile application. The pointers may be a 64-bit string that indicates a memory address storing the information. Using the pointer, processors may retrieve the information at a later time.

However, using pointers to retrieve information may be inefficient and require significant memory space. For example, processors may expend substantial amounts of execution time to retrieve the information using these pointers. Further, along with the actual information being stored in memory, the processor may need to store the pointer in memory as well. Storing pointers require significant amounts of memory space, especially if the actual data sizes are small relative to the pointer sizes. To circumvent this, traditionally, processors executing software have attempted to compress these pointers. But, the compressed pointers may be many different sizes. Thus, there is a lot of complexity on managing how to store the compressed pointers of varying sizes in a fixed size block of memory. Further, compression and decompression usually needs to be applied to a large block of data, even if the processor executing software tries to access the memory pointed to by a sole pointer within the compressed block of data. This compression and decompression has a performance and/or latency cost. Typically, higher compression ratios require compressing more data, but the more data that is compressed, the greater the cost to compress and decompress it for a single access to one of the inflated items. Accordingly, there exists a need for one or more improved methods and devices to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
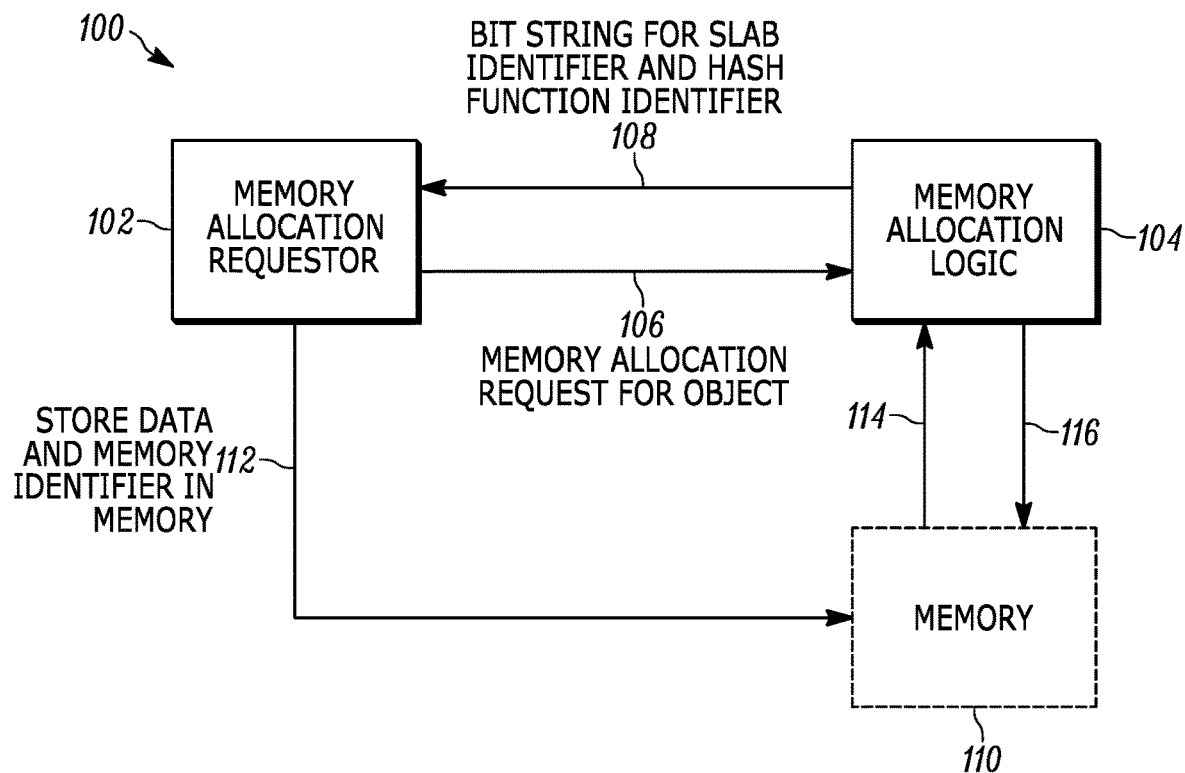
FIG. 1 is a schematic block diagram illustrating a device for implementing memory allocation using identifiers in accordance with one embodiment set forth in the disclosure.

In some implementations, memory allocation logic generates and provides memory identifiers, such as slab identifiers and hash function identifiers, to a memory allocation requestor, instead of providing pointers (e.g., traditional C-style pointers). The memory identifiers have a shorter bit length (e.g., 16 bits) than traditional pointers (e.g., 64 bits). By reducing the bit length, the memory allocation logic reduces the storage requirements for pointers and/or memory identifiers in memory and when applied to data structures. Additionally, and/or alternatively, when the data structure is properly optimized and for some classes of data structures, by reducing the bit length, the memory allocation logic makes primitives (e.g., look-ups and/or updates) faster to compute when it reduces the frequency and/or cost of accesses to the memory hierarchy.

Rather than returning a pointer to a portion of data, the memory allocation logic returns a concatenated tuple consisting of a slab identifier and a hash identifier, where the slab identifier identifies a slab of memory from which fixed data sizes (e.g., memory allocation sizes) are allocated and the hash identifier records which hash function is used to select the region to allocate from the slab. By enabling this form of allocation, hierarchical linked data structures, such as radix trees and B trees that allocate nodes at the page granularity (common to page tables and database indexes), can increase the per-node fanout. When fanout increases permit reducing the maximum tree height while still indexing the same amount of data, fewer nodes need to be accessed when traversing the index since the number of levels between the root and leaves is reduced. Further, given nodes correspond to pages, fewer memory pages are accessed when walking the index. During resolution of virtual addresses to physical addresses for each node and its associated page, since fewer pages are accessed, the occurrence of page faults decreases. When the data structure is implemented as the index for a hardware page table, permitted the increased fanout enables reducing the hardware-defined depth of the index, then hardware page table walkers would require accessing fewer pages on average for a page fault that misses in the memory management unit's (MMU)

translation caches. The technique is also useful in hash tables and other data structures like linked lists and binary trees for reducing their memory use, which has performance benefits when it enables reducing the memory footprint of program working sets for hardware cache and main memory.

In some implementations, in response to obtaining the memory allocation request from the memory allocation requestor, the memory allocation logic generates a slab identifier and a hash function identifier indicating a hash function. The slab identifier indicates a memory region associated with a base data size. In some variations, the base data size is an arbitrary value that is not a power of 2 bit or byte size (e.g., 6, 10, 30). However, in other variations, the base data size can be a power of 2 bit or byte size (e.g., 2, 4, 8, 16). For example, the memory allocation logic determines blocks of memory (e.g., candidate slabs) based on the data. Further, the memory allocation logic uses hash functions to compute hash values based on the request identifier from the memory allocation request. From the hash values and the candidate slabs, the memory allocation logic determines a viable memory location (e.g., a viable candidate slot) to store the data. Using the viable memory location, the memory allocation logic generates a slab identifier and a hash function identifier identifying the memory location. The memory allocation logic provides a bit string including the slab identifier and the hash function identifier to the memory allocation requestor.

In some implementations, a concatenated tuple including the slab identifier and the hash function identifier is generated. In some examples, the memory allocation request includes the base data size and a request identifier. The hash function identifier is based on the request identifier from the memory allocation request. A slab identifier is generated based on the base data size. In some implementations, the request identifier includes a request identifier value that is a virtual memory address or a physical memory address. The hash function identifier is generated based on the virtual or physical memory address. In some variations, the bit string including the slab identifier and the hash function identifier is stored in a first memory location. The slab identifier and the hash function identifier is obtained from the first memory location. The data corresponding to the memory allocation request from a second memory location is retrieved based on the slab identifier, the hash function identifier, and/or the request identifier.

In some examples, a subset from multiple slabs corresponding to the base data size is determined based on comparing slab metadata for the multiple slabs with the base data size from the memory allocation request. Each of the slabs indicates a distinct memory region. A memory location to store the data corresponding to the memory allocation request is selected. A slab identifier and a hash function identifier is generated based on the memory location.

In some implementations, multiple candidate slots from the subset of slabs is determined based on the request identifier and multiple hash functions. The memory location is selected based on the multiple candidate slots. In some examples, a viable candidate slot indicating a memory location is determined based on the multiple candidate slots. The data is stored in the memory location. In some variations, a bit vector for the multiple candidate slots is determined within the subset of multiple slabs. A viable candidate slot is determined based on performing an operation on the bit vector. In some instances, a viable candidate slot is determined based on performing an atomic operation on the bit vector. In some variations, a viable candidate slot is determined based on performing a read operation, a set operation, and/or an update operation on the bit vector. In some examples, an atomic update operation to update the bit vector is performed based on storing the data in the memory location. In some instances, an atomic compare-exchange operation to update the bit vector is performed based on storing the data in the memory location. In some variations, an atomic OR operation to update the bit vector is performed based on storing the data in the memory location.

FIG. 1 illustrates one example of a device 100 for implementing memory allocation using identifiers. In some variations, the device 100 includes any type of computing device or apparatus suitable for implementing aspects of embodiments of the disclosed subject matter. Examples of devices include but are not limited to workstations, servers, cloud computing platforms, laptops, desktops, tablet computers, hand-held devices, game consoles, processors such as general-purpose graphics processing units (GPGPUs), APUs, CPUs, GPUs, wearables, displays, printers, integrated circuits, state machines, and the like, all of which are contemplated within the scope of FIG. 1, with reference to various components of the device 100.

The device 100 includes a memory allocation requestor 102, memory allocation logic 104, and memory 110. The memory allocation requestor 102 in this example is any entity that issues a memory allocation request. For example, in some instances, the memory allocation requestor 102 is a hardware entity (e.g., a computing device, platform, server, CPU, GPU, embedded processor, FPGA, gates, logic) that stores data in memory 110. Memory 110 is any type of memory, such as but not limited to device or system memory and/or processor or chip memory (e.g., cache memory). Additionally, and/or alternatively, in some examples, the memory 110 is already within the memory allocation requestor 102 (e.g., in examples where the memory allocation requestor 102 is a CPU or GPU) and/or the memory allocation logic 104.

The memory allocation requestor 102 requests an available memory location to store data. Data can include any suitable data such as one or more objects, variables, data structures, nodes or objects within one or more linked data structures, data representing functions, memory identifiers, and/or any combination thereof. Additionally and/or alternatively, the memory request indicates an associated data size (e.g., a memory allocation size) for the data. For instance, the memory request indicates a bit or byte size, such as 36-bytes, for the data.

The memory allocation logic 104 employs hashing to allocate memory for the data and accepts a user-specified request identifier to drive the allocation by serving as an input to a collection of hash functions that each input a candidate slot within a slab (e.g., succinct_ptr a=malloc (user specified_request_identifier, data_size), where in a simple implementation&memory_slabs[a.slab_id][a.hash_fcn_id(user_specified_request_identifier, slab_size_in_slots)] produces the full 64-bit address to which "a" points). In other words, the memory allocation logic 104 generates memory identifiers, such as a slab identifier and/or a hash function identifier, corresponding to the data and in response to the memory allocation request from the memory allocation requestor 102. The generated memory identifiers indicate a memory location (e.g., a memory address) to store the data. The memory allocation logic 104 provides the slab identifier and hash function identifier indicating the memory location to the memory allocation requestor 102. In some variations, to generate the memory identifiers, the memory allocation logic 104 reads and/or writes 114, 116 information in memory 110.

In some examples, the memory allocation requestor 102 and/or the memory allocation logic 104 stores the data in the memory location indicated by the generated memory identifiers. Additionally, and/or alternatively, the memory allocation requestor and/or the memory allocation logic 104 uses a request identifier corresponding to the data and the generated bit string (e.g., the hash function identifier and the slab identifier) to determine the memory location storing the data and/or retrieve the data from memory 110. By using the generated memory identifiers, the memory allocation requestor 102 and/or the memory allocation logic 104 uses less virtual memory. Further, in some examples, by using less virtual memory, application data (e.g., hot data and/or total data) is decreased. For example, hot data (e.g., data that is frequently accessed and transferred within a given system) is stored in cache memory (e.g., processor L1, L2, and/or L3 caches). Total application data is stored in device or system memory (e.g., off-chip memory). Thus, by generating memory identifiers, the memory allocation requestor 102 and/or the memory allocation logic 104 uses less physical memory 110 (e.g., cache memory and/or device or system memory).

Additionally, and/or alternatively, the memory allocation requestor 102 and/or the memory allocation logic 104 passes in the address of the slab identifier and the hash function identifier as a request identifier to the allocator (e.g., succinct_ptr a=malloc(&a, size_of_the_requested_data). The use of this feature increases the fanout of the linked data structures such as B+ trees by increasing the number of pointers that a fixed-size node (e.g., 4 KB or other) can hold. The operation of device 100, including the memory allocation requestor 102 and the memory allocation logic 104 will be explained in more detail below.

The illustrative device 100 is not intended to suggest any limitation as to the scope of use or functionality of embodiments of the present disclosure. Neither should the illustrative device 100 be interpreted as having any dependency or requirement related to any single component or combination of components illustrated therein. Additionally, various components depicted in FIG. 1, in embodiments, may be integrated with various elements of the other components depicted therein (and/or components not illustrated).

Figure 2:
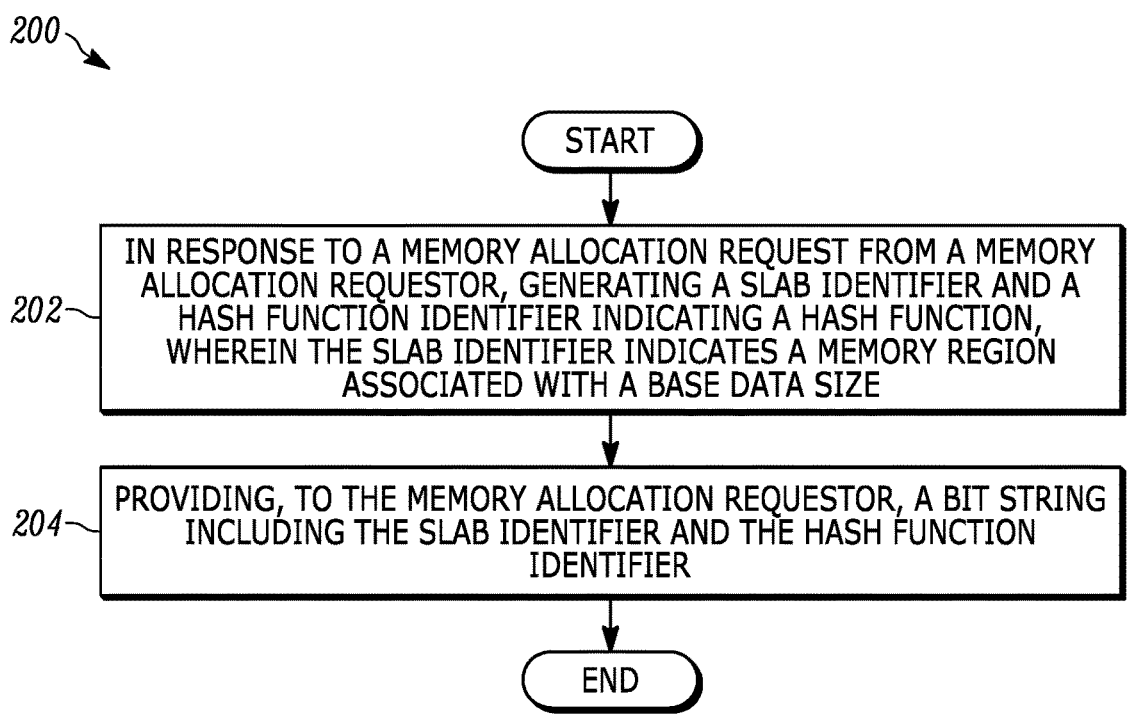
FIG. 2 is a flowchart illustrating a method for implementing memory allocation using identifiers in accordance with one embodiment set forth in the disclosure.

FIG. 2 illustrates one example of a method 200 for implementing memory allocation using identifiers. FIG. 2 is described below in reference to the device 100 illustrated in FIG. 1. However, any suitable structure can be employed. For example, as explained in further detail below, in some variations, method 200 is implemented using the memory allocation logic 104 and/or the memory allocation selection unit 318 illustrated in FIGS. 3 and 4.

In operation, at step 202, the memory allocation logic 104 generates a slab identifier and a hash function identifier in response to a memory allocation request from a memory allocation requestor 102. The slab identifier indicates a memory region associated with a base data size and the hash function identifier indicates a hash function. In some variations, the base data size is an arbitrary value that is not a power of 2 bit or byte size (e.g., 6, 10, 30). However, in other variations, the base data size can be a power of 2 bit or byte size (e.g., 2, 4, 8, 16). At step 204, the memory allocation logic 104 provides, to the memory allocation requestor 102, a bit string including the slab identifier and the hash function identifier. In some examples, the bit string that includes the slab identifier and the hash function identifier also includes other metadata.

Figure 3:
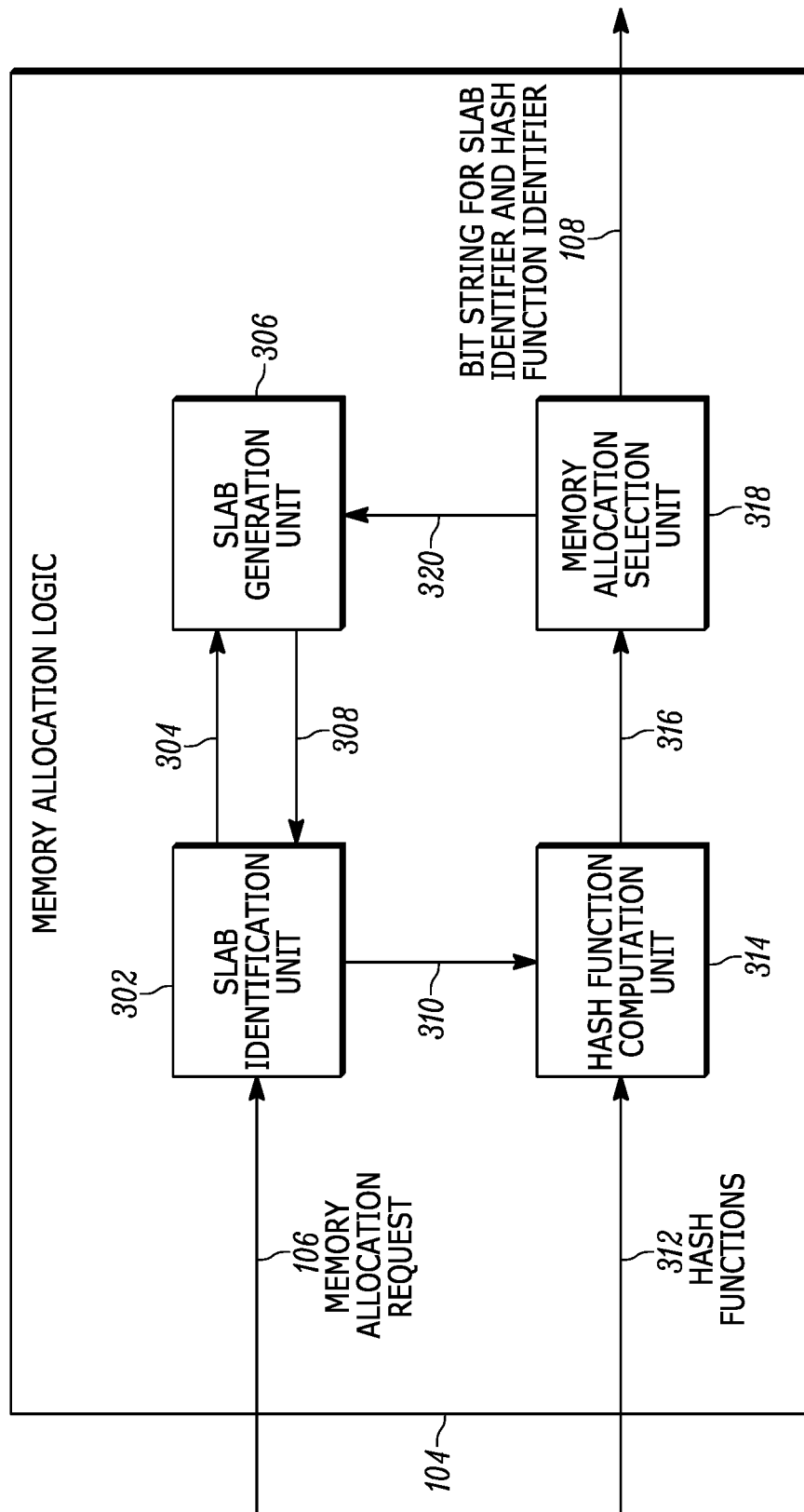
FIG. 3 is a schematic block diagram illustrating an example of memory allocation logic for implementing memory allocation using identifiers in accordance with one embodiment set forth in the disclosure.

FIG. 3 illustrates an example of memory allocation logic 104 for implementing the method 200. The memory allocation logic 104 includes a slab identification unit 302, a slab generation unit 306, a hash function computation unit 314, and/or a memory allocation selection unit 318. Although these sub-units 302, 306, 314, and 318 are illustrated as children units subordinate of the parent unit, each sub-unit can be operated as a separate unit from the memory allocation logic 104, and other suitable combinations of sub-units are contemplated to suit different applications. Also, while the functions of the sub-units are shown and described below as executing in series, in some variations, the functions of the sub-units are executed in with partial or complete overlap. For example, as explained below, the hash function computation unit 314 and the slab identification unit 302 are executed in with partial or complete overlap. The memory allocation logic 104 is any suitable logic configuration including, but not limited to, one or more state machines, one or more digital signal processors, as part of one or more CPUs, GPUs, APUs or processors that execute kernels, and/or other suitable structure as desired. As described in further detail below, the memory allocation logic 104 generates and provides memory identifiers, such as slab identifiers and/or hash function identifiers, to the memory allocation requestor 102.

In operation, the slab identification unit 302 obtains a memory allocation request 106 for a portion of data. For example, as mentioned previously, the memory allocation requestor 102 transmits (e.g., sends, and/or provides) a memory allocation request 106 and the slab identification unit 302 obtains (e.g., receives) the memory allocation request 106. In some variations, the memory allocation request 106 includes a request identifier and/or a base data size (e.g., a bit or byte size) for the data. The request identifier is associated with the data from the request 106.

In some examples, for data structures with actual key fields, the key is used to generate the slab identifier and the hash identifier. For example, for a key K and requested data size of O bytes, the allocation looks like malloc(K, O). Then, as explained below, after determining a candidate slab, the key (K) and size of the slab in slots are used to generate a candidate slot location by passing them as inputs to one or more of the hash functions. The hash functions then output a value (e.g., an integer) that corresponds to the index of the candidate slot within the slab.

In other variations, an alternative method is to use a virtual/physical memory address as the request identifier. This method is useful when there are many key objects or data types with a value of K that are simultaneously stored in their respective data structure or keys are not present or are not stored at every level of the data structure. For a node containing simply an array of concatenated slab and hash function identifiers, the address of each element in the array is passed in when allocating the slot to which that element points. If the node is called n and includes an array of pointers n.els, setting the pointer at the ith index in the array can be implemented in the following simple C: n.els[i]=malloc(&n.els[i], O). Additional, and/or alternative variations with more error checking or differing levels of abstraction are also possible. As will be explained below, the memory allocation logic 104 uses the request identifier to generate a slab identifier and/or a hash function identifier.

In response to obtaining the memory allocation request 106, the slab identification unit 302 identifies slabs of memory with the same data size (e.g., base memory allocation size) as the base data size indicated in the memory allocation request 106. In some variations, for example, the memory allocation logic 104 (e.g., the slab generation unit 306) maintains a series of slabs, where a slab corresponds to a contiguous chunk of memory (e.g., virtual or physical). In other variations, the memory allocation logic 104 (e.g., the slab generation unit 306) maintains a series of slabs that are contiguous and/or non-contiguous chunks of memory.

A slab is used to allocate a single data size, the motivation being that data, such as objects, are often not a power of two bytes in size, and so to prevent memory fragmentation, similar sized data is allocated from the same slab. A common application for slab-style memory allocation is for efficient allocation of fixed-size OS kernel objects with strange sizes that do not divide well into power of two memory block allocations. Slabs are created using existing OS primitives for memory allocation (e.g., the mmap or brk system calls for allocating virtual memory in Linux if the allocator is implemented outside of the kernel). The metadata for the slabs tracks the start and end of each slab and which parts of the slab have been allocated. In some instances, additional metadata like the size of the slab, whether the slab needs to be garbage collected, virtual to physical translations, statistics, and/or permissions are also maintained.

In other words, the slab identification unit 302 compares slab metadata for multiple different slabs with the data size of the data from the request 106. From the comparison, the slab identification unit 302 determines a subset of slabs with metadata indicating the base memory allocation size. For example, metadata for each slab includes information indicating a base memory allocation size for the corresponding slab (e.g., a 5-byte size, 20-byte size, or a 48-bit size). If the slab metadata indicates a base memory size of 20-bytes, then each portion of data stored in the slab of memory is 20-bytes in size. Based on comparing the metadata (e.g., the base memory size) for the slabs with the data size indicated in the request 106, the slab identification unit 302 determines slabs (e.g., candidate slabs) with the same base memory size as the data size from the request 106. The slab identification unit 302 provides information 310 (e.g., the slab identifiers for the identified slabs of memory and/or the request identifier) to the hash function computation unit 314.

In some examples, such as in hardware implementations of the memory allocation logic 104, the slab metadata is stored in static random-access memory (SRAM) arrays near the memory allocation logic 104. In other examples, the slab metadata is stored in memory (e.g., processor memory and/or device memory) and/or as a data structure. Further, the slab metadata is also co-stored in the slab itself or stored separately from the slab.

In some variations, the slab identification unit 302 does not identify a slab with the same base memory size as the data size from the memory allocation request 106 (e.g., no slab is allocated to the data size from the request 106). In such variations, the slab identification unit 302 provides information 304 (e.g., the data size from the request 106) to the slab generation unit 306. The slab generation unit 306 determines and/or allocates a new slab of memory (e.g., a new memory region) based on the data size from the request 106. For example, the base memory size of the new slab of memory is the same as the data size from the request 106. Further, the slab generation unit 306 generates metadata for the new slab indicating the new slab identifier and the base memory size for the slab. For example, if the data size from the request 106 is 10 bytes and the slab identification unit 302 does not identify a slab with 10 bytes, then the slab generation unit 306 determines and/or allocates a new slab of memory with a base memory size of 10 bytes. The slab generation unit 306 provides information 308 (e.g., the metadata indicating the slab identifier and data size) to the slab identification unit 302. The slab identification unit 302 uses the metadata for the new slab to provide information 310 to the hash function computation unit 314. In some examples, the slab generation unit 306 clears the information within the new slab. For example, the slab generation unit 306 performs a logical AND operation to clear the information within the new slab. In some examples, such as an example where the memory allocation logic 104 is thread-safe and concurrent, the slab generation unit 306 performs an atomic AND operation to clear the information within the new slab.

The hash function computation unit 314 obtains information 310 (e.g., a request identifier from the request 106) and one or more hash functions 312. The hash function computation unit 314 determines (e.g., computes) hash values based on the hash functions 312 and the request identifier value from the request 106. For example, the hash function computation unit 314 obtains at least one hash function 312, such as hash functions $H_1$, $H_2$, and $H_3$. The hash function computation unit 314 determines hash values for each of the hash functions, $H_1$, $H_2$, and $H_3$, using the request identifier value from the request 106 as the input. The hash function computation unit 314 provides information 316 (e.g., the hash values from the hash functions $H_1$, $H_2$, and $H_3$) to the memory allocation selection unit 318. In some variations and as explained below, the hash function computation unit 314 determines hash values based on a bit vector.

In some examples, the hash function computation unit 314 and the slab identification unit 302 execute in parallel. For example, the hash function computation unit 314 and/or the slab identification unit 302 obtain the memory allocation request 106. Then, as described above, the slab identification unit 302 determines candidate slabs for the data and the hash function computation unit 314 determines hash values from the hash functions. The operations of the slab identification unit 302 and the hash function computation unit 314 execute simultaneously and/or substantially simultaneously (e.g., the hash function computation unit 314 does not wait for output from the slab identification 302 prior to computing the hash functions). However, any suitable operation may be employed. The memory allocation selection unit 318 obtains the hash values and/or the candidate slabs from the hash function computation unit 314 and the slab identification unit 302.

The memory allocation selection unit 318 obtains information 316 (e.g., the request 106, the hash values, and/or the candidate slabs) from the hash function computation unit 314 and/or the slab identification unit 302. The memory allocation selection unit 318 determines a viable candidate slot (e.g., viable memory location) to store the data from the request 106 based on the hash values and/or the candidate slabs. Further, the memory allocation selection unit 318 generates and/or provides a slab identifier and a hash function identifier based on the viable candidate slot.

Figure 4:
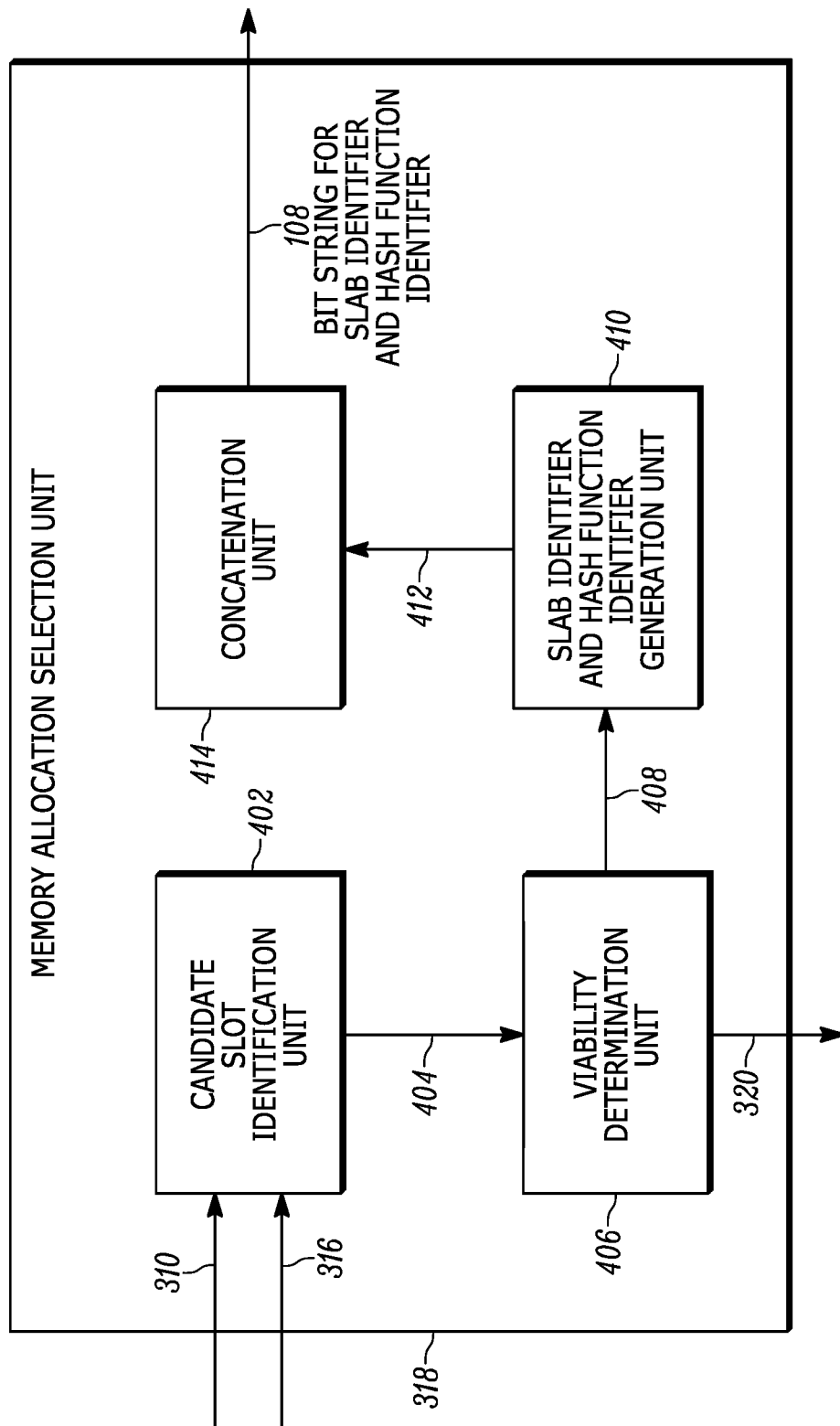
FIG. 4 is a schematic block diagram illustrating a memory allocation selection unit for implementing memory allocation using identifiers in accordance with one embodiment set forth in the disclosure.

FIG. 4 illustrates an example of a memory allocation selection unit 318 for implementing the method 200. The memory allocation selection unit 318 includes a candidate slot identification unit 402, a viability determination unit 406, a slab identifier and hash function identifier generation unit 410, and/or a concatenation unit 414. Although these sub-units 402, 406, 410, and 414 are illustrated as children units subordinate of the parent unit, each sub-unit can be operated as a separate unit from the memory allocation selection unit 318, and other suitable combinations of sub-units are contemplated to suit different applications. Also, while the functions of the sub-units are shown and described below as executing in series, in some variations, the functions of the sub-units are executed in parallel.

In operation, the candidate slot identification unit 402 obtains information 310 (e.g., the candidate slabs from the slab identification unit 302) and/or information 316 (e.g., the hash values from the hash function computation unit 314). Based on the hash values and/or the candidate slabs, the candidate slot identification unit 402 determines candidate slots (e.g., memory locations) within the candidate slabs to store the data. The candidate slot identification unit 402 provides the candidate slot information 404 for the slabs to the viability determination unit 406. The viability determination unit 406 obtains the candidate slot information and determines whether any of the candidate slots are viable to store the data associated with the request 106. In other words, the viability determination unit 406 determines whether any of the candidate slots are "free" (e.g., available to store the data).

Figure 5:
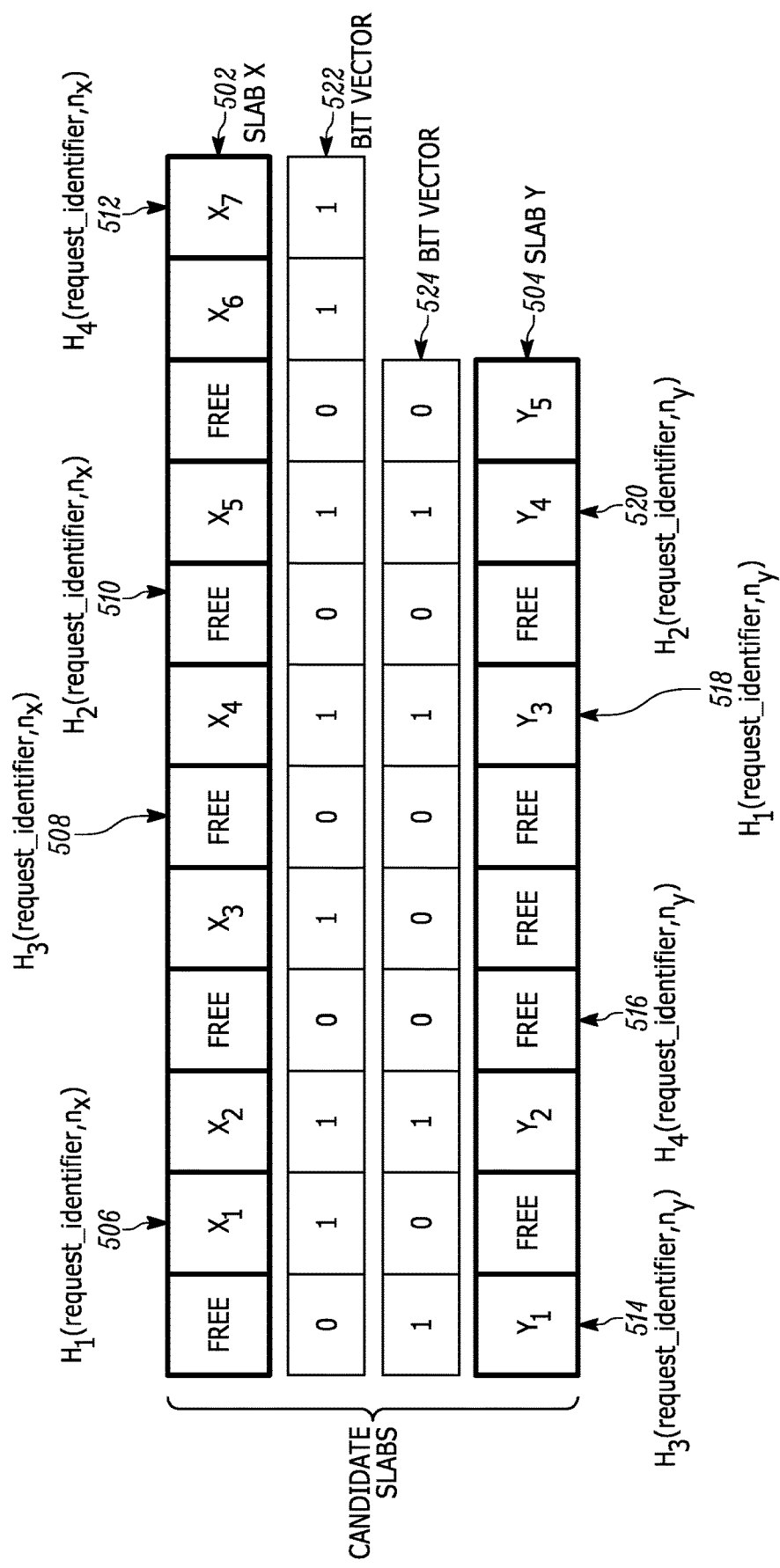
FIG. 5 is an exemplary representation of one or more candidate slabs of memory in accordance with one embodiment set forth in the disclosure.

FIG. 5 illustrates an example of candidate slabs of memory. For example, FIG. 5 shows two candidate slabs of memory, slab x 502 and slab y 504. As mentioned previously, the memory allocation logic 104 determines candidate slabs (e.g., slab x 502 and slab y 504) based on the data size from the memory allocation request 106. From the candidate slabs, the candidate slot identification unit 402 determines candidate slots based on the hash functions. For example, the candidate slot identification unit 402 obtains hash values (e.g., values from the hash functions $H_1$, $H_2$, $H_3$ and $H_4$) from the hash function computation unit 314. The candidate slot identification unit 402 determines (e.g., maps) these hash values to memory locations within the candidate slabs x and y. The mapped memory locations are the candidate slots. For instance, slab x 502 has candidate slots 506, 508, 510, and 512. Slab y 504 has candidate slots 514, 516, 518, and 520. From the candidate slot information 404, the viability determination unit 406 determines that candidate slots 508 and 510 are free from slab x 502 and that candidate slot 516 is free from slab y 504. Based on the determination, the viability determination unit 406 selects a viable candidate slot (e.g., slot 508) indicating a memory location to store the data, and provides information 408 indicating the viable candidate slot to the slab identifier and hash function identifier generation unit 410. The viability determination unit 406 identifies, from the candidate slab and/or slot pairings, the viable candidate slots and outputs one from among them using a selection method, algorithm, or other means.

In some variations, the viability determination unit 406 determines that there are no free candidate slots in the candidate slabs to store the data (e.g., all candidate slots are not free). In such instances, the viability determination unit 406 provides information 320 to the slab generation unit 306 indicating that there are no free candidate slots. Based on the information 320 and as described above, the slab generation unit 306 determines and/or allocates a new slab of memory for the data size indicated in the request 106. Further, the slab generation unit 306 generates metadata for the new slab indicating the new slab identifier and the base memory allocation size for the slab. Then, in the next iteration, the viability determination unit 406 determines a free candidate slot to store the data from the new candidate slab.

In some examples, the viability determination unit 406 determines, using a bit vector, whether any of the candidate slots are viable to store the data associated with the request 106. For example, the viability determination unit 406 maintains one or more bit vectors, where in the simplest form, a bit corresponds to the base units of memory (e.g., a slot) that collectively make up a slab. For instance, in a design with a bit vector per slab, if one slab has 1,000,000 slots to allocate 24 byte objects, then each such slot would have a corresponding bit in the bit vector that marks it as allocated or free. Note that this design is in contrast with a standard slab allocator, as it does not require maintaining one or more separate free lists.

In some examples, such as an example where the memory allocation logic 104 is thread-safe and concurrent, upon selecting an appropriate slab (either by finding the appropriate slab or creating a slab), the memory allocation logic 104 (e.g., the hash function computation unit 314) evaluates a pool of hash functions that output indexes into the bit vector. In some variations, for performance, the memory allocation logic 104 limits these hash functions to map to one to several four or eight byte words within the bit vector. Provided that one hash function maps to an unset bit in the bit vector, the allocation likely trivially succeeds. To establish the state of the region of interest within the bit vector and where the memory allocation logic 104 is thread-safe and concurrent, the memory allocation logic 104 (e.g., the viability determination unit 406) performs one or more atomic reads. The memory allocation logic 104 then searches for an unset bit within the atomically read regions. If the memory allocation logic 104 finds one that a hash function maps to, the memory allocation logic 104 performs an atomic OR, which takes the state that it read for that region and a single bit update (e.g., 0x1000 if deciding to allocate the 3rd slot in the region under zero indexing). Provided that the region has not been updated since the atomic read, the allocation succeeds. However, the atomic OR fails if the region state has been updated by another agent since the initial atomic read. In this event, the memory allocation logic 104 attempts to allocate from a different region or repeat its initial steps (e.g., redo the atomic read if the atomic OR does not report the updated state and then attempt to perform an atomic OR on a different bit provided that a hash function maps there). These semantics for atomic OR assume that the operation's success is predicated on whether the previously read value matches the newly read value before performing the update. In some examples, such as where the memory allocation logic 104 is not thread-safe and/or non-concurrent, the memory allocation logic 104 performs the above steps without using atomic operations (e.g., without atomic OR and/or reads), instead, the memory allocation logic 104 performs the above steps with non-atomic operations, such as OR operations and/or read operations.

In some variations, provided that none of the hash functions succeed, the memory allocation logic 104 (e.g., the slab generation unit 306) generates a new slab as described above. Note that this new slab need not be large in size and could be implemented as a stash, a small pool of memory for the exceedingly small minority of objects that are unable to be allocated in their main slab. To deallocate a slot, the memory allocation logic 104 performs an atomic AND that clears the deallocated slot. No preliminary read is performed provided that atomic AND operations are always valid. Note that in some examples, both the atomic OR and atomic AND are implemented as an atomic compare-exchange if the programming interface does not have API support for atomic ORs and ANDs that are only applied in the absence of an intermediate update to the region.

Additionally, and/or alternatively, in some variations, the memory allocation logic 104 (e.g., hash function computation unit 314) computes one initial hash function H, which will map the request identifier value to a multi-byte word (e.g., four or eight bytes) within a bit vector. The hash functions are then offsets within that word. For instance, $H_1$(request_identifier, slots_in_target_slab)=(H(request_identifier)+1) mod slots_in_target_slab is an example. For instance, to get a free slot, the memory allocation logic 104 (e.g., the viability determination unit 406) uses a high-performance implementation of a select operator. For example, select(x, R) returns the index of the xth least significant 0 bit in the region R. A high-performance select can be implemented on X86_64 using the PDEP and TZCNT instructions from the BMI2 ISA extension. Specifically, in some examples, the operator select(x, R)=TZCNT (PDEP(1<<x, R)) is used. In some variations, high-performance implementations that use in-register lookup tables are also used and perform better than this approach given the scalar nature of TZCNT and PDEP. To get the next free slot, select(0, R) suffices and returns the hash function ID. If select(0, R) returns a value of |R| (i.e., the size of the region R in bits) or a value that exceeds the maximum extent covered by the hash functions, then the allocation will proceed to another slab. The mask for the atomic OR operation is 1<<select(0, R). Note that if R is not aligned with memory (e.g., the region R corresponding to a bit vector, such as bit vector 522, is not aligned with a slab of memory, such as slab x 502), then additional shifting and masking is performed. Further, if R is large compared to the size of a word of memory, then additional processing is performed to correctly implement select.

In some variations, there are further optimizations for the reading of data from the bit vector. The memory allocation logic 104, using the bit vector, need not perform a perform an atomic read operation provided that the state of the bit vector is eventually consistent. Instead, the memory allocation logic 104 uses a regular load instruction provided that all updates via the atomic OR instructions maintain a strict ordering.

In some variations, the memory allocation logic 104 (e.g., the hash function computation unit 314) computes hash functions using double-hashing, a widely employed technique that achieves load balancing across regions that is functionally equivalent to using a set of fully random, non-conflicting, independent hash functions but is less expensive to compute. For example, the memory allocation logic 104 uses hash functions of the following form: $H_k$=h(k, x)=f(x)+k*g(x), where f(x) gives an initial offset into the bit vector, and k*g(x) provides a multiplicative offset from f(x)'s initial position. $H_k$ is mapped within the range 0 to (slots in the slab of interest—1) inclusive using modular arithmetic or another technique which roughly uniformly pseudo randomly maps the output of the double hashing computation to that range. With this technique, the memory allocation logic 104 performs an additional step prior to performing the select operation, where R is copied to a new variable, called R', bits that are not valid outputs from h are set to 1 in R', and then the select operator is applied. The output of the select operator is translated into the equivalent value k by using a table that maps indices in R to their corresponding value k. The table is populated prior to or when first performing the $H_k$ computations.

In at least one example of using the bit vector and referring to FIG. 5, slab x 502 has a corresponding bit vector 522 and slab y 504 has a corresponding bit vector 524. As shown, a "0" for a slot within memory indicates that the slot is free, and a "1" indicates that the slot is unavailable. Using the bit vector (e.g., bit vector 522 and 524), the viability determination unit 406 performs an operation on the candidate slot to determine whether any of the candidate slots has a "0" (e.g., free) bit value. If the candidate slot has a "0" bit value, then the viability determination unit 406 determines that the corresponding candidate slot is a viable candidate slot (e.g., available memory location). If the candidate slot has a "1" bit value, then the viability determination unit 406 determines that the corresponding candidate slot is a not viable candidate slot. In some variations, if there is more than one reader and the writer is not the reader (e.g., multiple threads), then the viability determination unit 406 performs an atomic read operation on the candidate slot to determine whether any of the candidate slots has a "0" (e.g., free) bit value.

Additionally, and/or alternatively, after storing the data corresponding to the request 106 in the memory location indicated by the slab identifier and hash function identifier, the viability determination unit 406 updates the bit vector using an update operation. The update operation is an OR operation, an atomic OR operation, a Compare-and-Exchange operation, and/or an atomic Compare-and-Exchange operation. In some instances, the viability determination unit 406 uses one operation (e.g., an atomic operation) to read, set, and update the bit vector.

The slab identifier and hash function identifier generation unit 410 obtains information 408 indicating the viable candidate slot (e.g., slot 508). Using the information 408, the slab identifier and hash function identifier generation unit 410 generates a hash function identifier and a slab identifier for the viable candidate slot. For example, if the candidate slot is slot 508, then the slab identifier and hash function identifier generation unit 410 generates a slab identifier indicating slab x 502 and a hash function identifier indicating hash function $H_3$. In some examples, the slab identifier and/or the hash function identifier are tuples, and are also any number of bits in length. A tuple is succinct, and along with the request identifier fed into the malloc call as described above, is sufficient to construct the full memory address of the object but typically uses 8 to 16 bits rather than the 48 or 64 bits (up to 8× space improvement) of a traditional pointer. Fewer bits can be used depending on the use of the allocator. For instance, in one such example, the hash function identifier is 8 bits in length and the slab identifier is also 8 bits in length whereas traditional pointers, such as standard C-style pointers, are 64 bitts in length on virtually all 64-bit computers.

The concatenation unit 414 obtains information 412 (e.g., the slab identifier and the hash function identifier) and generates a bit string. For example, the concatenation unit 414 generates a bit string for the generated memory identifiers (e.g., the slab identifier and the hash function identifier) . For instance, if the slab and hash function identifiers are 8 bits in length (e.g., tuples), then the concatenation unit 414 combines and generates a bit string that is 16 bits in length (e.g., a concatenated tuple). The first 8 bits is the slab identifier and the second 8 bits is the hash function identifier. The concatenation unit 414 provides the bit string 108 (e.g., the concatenated bit string including the slab identifier and the hash function identifier) to the memory allocation requestor 102.

The memory allocation requestor 102 uses the generated memory identifiers to determine the memory location of the data and/or retrieve the data. For example, in some variations, the memory allocation requestor 102 provides the slab identifier and the hash function identifier to the memory allocation logic 104. The memory allocation logic 104 includes functionality of the memory controller, and obtains the data from the memory location using the slab and hash function identifier. For example, if the data is stored in slot 508, the memory allocation logic 104 identifies the slab for the data (e.g., slab x 502) and the hash function computation unit 314 uses the hash function (e.g., hash function $H_3$) to determine the memory location for the data (e.g., slot 508). The memory allocation logic 104 provides the memory location and/or the data to the memory allocation requestor 102.

In some variations, a separate memory controller includes functionality to read and determine the memory location from the slab identifier and the hash function identifier. For example, the memory controller obtains the slab and hash function identifier, and uses the generated identifiers to determine a memory location (e.g., slot 508). The memory controller provides the memory location (e.g., slot 508) and/or the data to the memory allocation requestor 102. In some variations, a backup memory allocator, such as a buddy allocator, is used for allocating slabs and/or determining slab identifiers.

Figure 6:
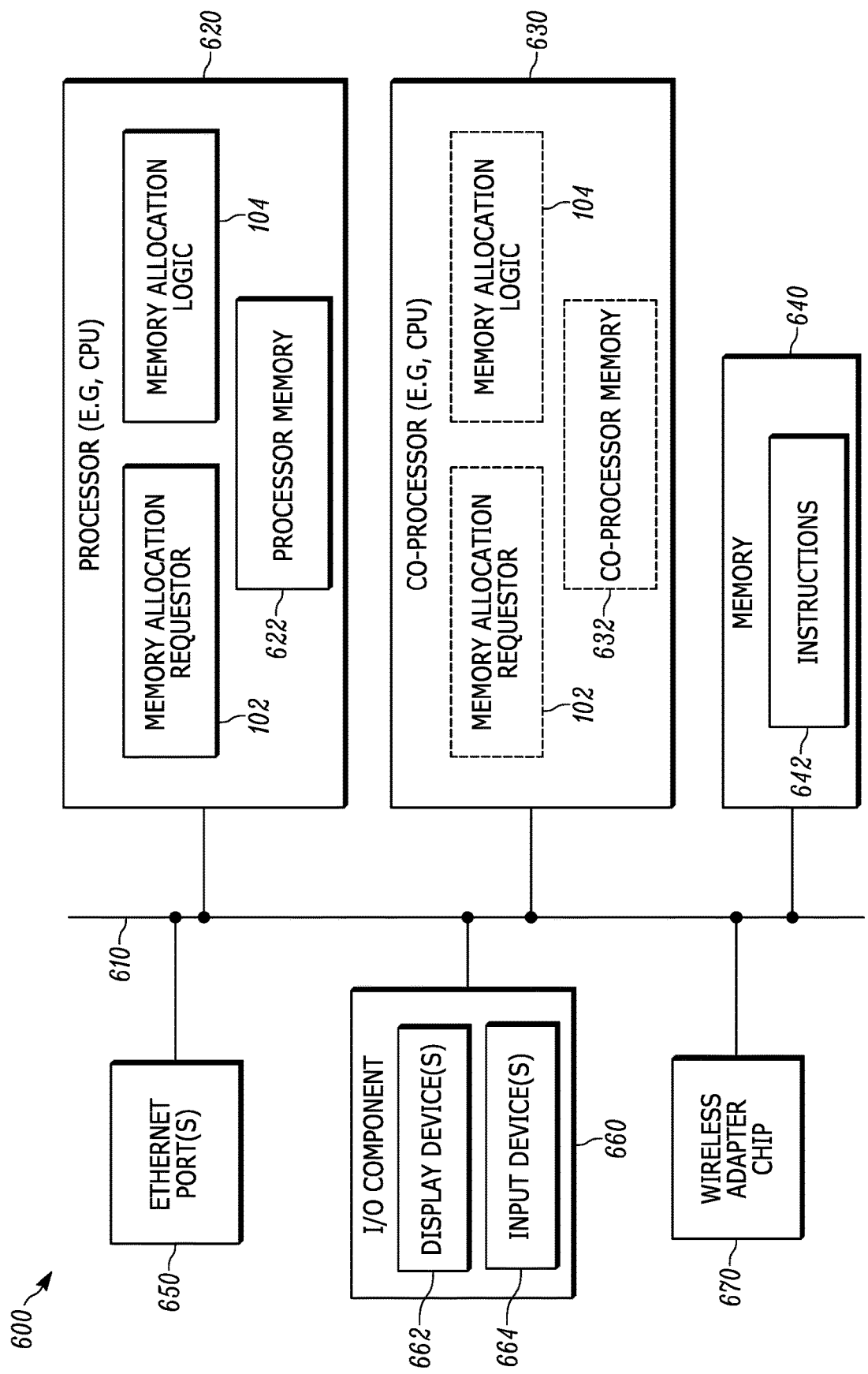
FIG. 6 is a schematic block diagram illustrating another device for implementing memory allocation using identifiers in accordance with one embodiment set forth in the disclosure.

FIG. 6 is a schematic block diagram illustrating another example of a device 600 for implementing memory allocation using identifiers. Device 600 includes a bus 610 that, directly and/or indirectly, couples the following devices: a processor 620 (e.g., CPU), a co-processor 630 (e.g., GPU), a memory 640, one or more Ethernet port(s) 650, I/O component(s) 660, and wireless adapter chip(s) 670. Any number of additional components, different components, and/or combinations of components is also included in the device 600. In some implementations, the I/O component(s) 660 include a presentation component that presents information to a user such as, for example, a touch screen, display device(s) 662, a speaker, a printing device, and/or the like, and/or input device(s) 664 such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 610 represents one or more busses (such as, for example, an address bus, data bus, or combination thereof). Similarly, in some implementations, the device 600 includes a number of processors 620 and co-processors 630, a number of memory components 640, a number of Ethernet port(s) 650, a number of I/O components 660, and/or a number of wireless adapter chip(s) 670. Additionally, any number of these components, or combinations thereof, is distributed and/or duplicated across a number of computing devices.

In one example, the processor 620 (e.g., CPU) includes a memory allocation requestor 102, memory allocation logic 104, and/or a processor memory 622. For example, the memory allocation logic 104 allocates memory (e.g., processor memory 622 and/or device memory 640) for the memory allocation requestor 102. In some instances, the operation of the memory allocation logic 104 is implemented as code within a driver, such as a graphics driver. In one example, the co-processor 630 (e.g., GPU) includes a memory allocation requestor 102, a memory allocation logic 104, and/or a co-processor memory 632. The memory allocation logic 104 allocates memory (e.g., processor or cache memory 632, such as L1, L2 memory, and/or device memory 640) for the memory allocation requestor 102. In some variations, the processor 620 and/or the co-processor 630 includes multiple cores, and each core includes the memory allocation logic 104.

In one example, the device memory 640 stores computer-executable instructions 642 that when executed cause the processor 620 and co-processor 630 to implement aspects of embodiments of device components discussed herein and/or to perform aspects of embodiments of methods and procedures discussed herein. The memory 640 is RAM, ROM, or any suitable memory.

The illustrative device 600 shown in FIG. 6 is not intended to suggest any limitation as to the scope of use or functionality of embodiments of the present disclosure. Neither should the illustrative device 600 be interpreted as having any dependency or requirement related to any single component or combination of components illustrated therein.

Figure 7:
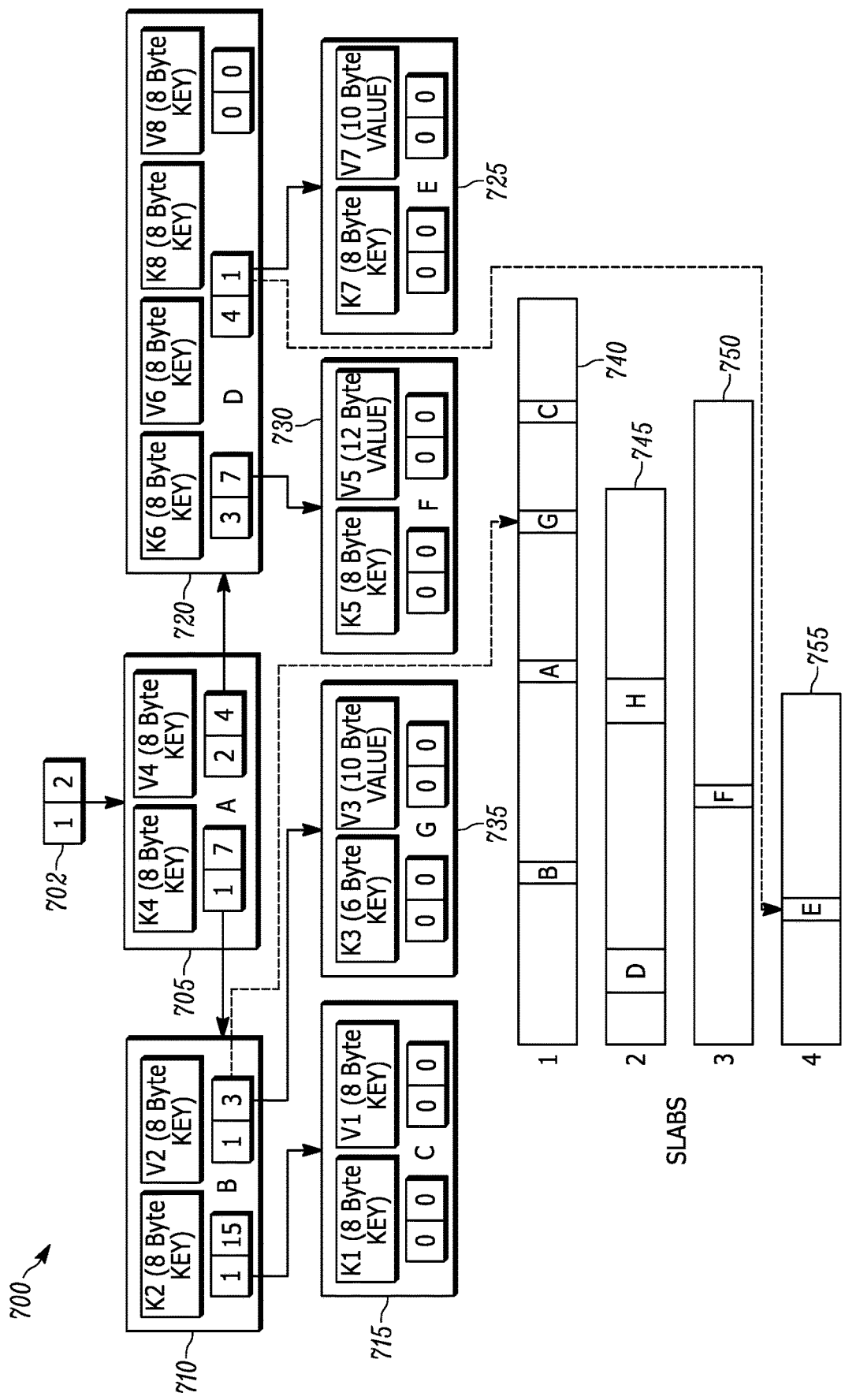
FIG. 7 illustrates an example of using the memory allocation logic and identifiers in accordance with one embodiment set forth in the disclosure.

FIG. 7 shows an example of using the memory allocation logic 104 and memory identifiers (e.g., pointers) to store and use a search tree 700 with nodes of multiple sizes, where each node is stored in a slot of a slab. Nodes include key fields, associated values, and concise pointers (i.e., slab ID and hash function ID) to child nodes.

The tree 700 indexes the ordered map {(K1, V1), (K2, V2), (K3, V3), (K4, V4), (K5, V5), (K6, V6), (K7, V7), (K8, V8)}, where the first field is a key (e.g., K1) and the second field is an associated value (e.g., V1). The map maintains an ordering over the keys where K1 is defined to have the minimum value and K8 the maximum value. There is no explicit assumption about the numerical ordering of the values. For example, just because K6 is less than K7 and K2 is less than K5 that does not mean that V6 is less than V7 or V2 is less than V5. The example assumes the standard semantics of an ordered search tree that obeys the search tree order property. For example, in the simple binary tree case, it is assumed that all descendants in the left subtree have keys that are less than the common ancestor, whereas as descendants in the right subtree have keys that are greater than the common ancestor. As an example, Node A 705, which stores (K4, V4), has descendants in the left subtree that all have keys less than K4 (e.g., K1, K2, and K3), and the right subtree has descendants that all have keys that are greater than or equal to K4 (e.g., K5, K6, K7, K8).

The root of the tree (A) 702 is pointed to by the concise pointer with the concatenated tuple (1, 2), where 1 corresponds to the slab ID and 2 is the hash function ID. For sake of explanation, assume that the pointer representation (1, 2) and the other pointer representations each take 2 bytes to store (one byte for the slab ID and one byte for the hash function ID). Note, in a real system, the size of each pointer field may be more or less depending on the needs of the application and whether the allocator is shared among multiple data structures or processes.

Five types of nodes are shown in the tree. It is likely that additional metadata that identifies the node type may need to be stored in the node, but for ease of explication, the additional metadata identifying the node type is not shown. The node types, along with information pertinent to allocating the storage for the nodes of the tree are described below.

For example, Type V nodes (e.g., node E 725) have an 8-byte key, a 10-byte value, and two 2-byte concise pointers, one which points to the left child and one which points to the right child. The size of this node is 22 bytes.

Type W nodes (e.g., Node F 730) have an 8-byte key, a 12-byte value, and two 2-byte concise pointers, one which points to the left child and one which points to the right child. The size of this node is 24 bytes.

Type X nodes (e.g., Nodes A 705, B 710, and C 715) have an 8-byte key, an 8-byte value, and two 2-byte concise pointers, one which points to the left child and one which points to the right child. The size of this node 20 bytes.

Type Y nodes (e.g., Node G 735) have a 6-byte key, 10-byte value, and two 2-byte concise pointers, one which points to the left child and one which points to the right child. The size of this node is 20 bytes.

Type Z nodes (e.g., Node D 720) have two 8-byte keys, two 8-byte values, and three 2-byte concise pointers. The left-most pointer points to the subtree with descendants with keys less than the first key (e.g., Node F 730 for Node D 720), the middle pointer points to descendants with keys that are between the two keys in the type Z node (e.g., Node E 725 for Node D 720), and the final pointer points to the subtree with descendants whose keys are greater than or equal to the second key in the type Z node (e.g., unset for Node D 720 as K8 is the largest valued key among K1, K2, K3, K4, K5, K6, K7, and K8). The size of the node is 38 bytes.

As illustrated, (0, 0) is a special tuple that is reserved for marking a NULL pointer (i.e., a pointer that points to nothing, which takes on a NULL value to demarcate it as such). The slabs where the nodes are allocated are shown at the bottom of the figure (e.g., slabs 740, 745, 750, 755). In the example, Type X and Type Y nodes (e.g., nodes A 705, B 710, C 715, and G 735) are allocated in slab 1 740. Even though X and Y nodes are different types and can be implemented as different classes of objects, they use the same amount of memory, and so they are both placed in the slab with the same base data size for its slots. In the example, each slab's base data size is the same as the size of the data of the nodes' data that it stores. This assumption need not hold in the downward direction, however, as it is safe to allocate a slot with a larger base data size to an object or data that is smaller than the base data size. For example, it would have been safe to allocate nodes A 705, B 710, C 715, and G 735 in any of the four slabs 740, 745, 750, 755 because 20 bytes is less than or equal to the smallest base data size among the slabs.

Two dotted arrows 760 and 765 are shown that signify the interpretation of two of the concise pointers. The other pointers (dotted lines to the storage of nodes B 710, A 705, C 715, D 720, and F 730 in the slabs) are left out for figure clarity, but they should be interpreted to be present.

Slab 2 745 has allocated a slot to a piece of data called H. H is any other piece of data and might not be associated with the tree in the example. It illustrates that multiple data structures from the same or multiple processes can share the same slabs and allocator.

In some examples, the concise pointer is not sufficient by itself to determine the memory address of the start of each allocation (i.e., the address of 0th byte of each allocated slot). In such instances, a request identifier is also used to reconstruct the full memory address. For example, the request identifier is a memory address, one of key values K1 through K8, the address (e.g., a pointer or reference) of one of the key values K1 through K8, and/or some other deterministic value. To retrieve the full address, the memory allocation logic 104 passes the request identifier associated with a concise pointer to the hash function encoded within the concise pointer. For instance, the root node is pointed to be (1, 2), so hash function 2 (e.g., H2) would be called on the request identifier. The index in the slab 1 740 for the root node A would be H2(request identifier), and the full address in a C-style language would be retrievable using something like the following, that is, assuming slabs is as an array of pointers to the active slabs: &slabs[1][H2(request identifier)]. The [1] is used retrieve the pointer to the slab at index 1 (i.e., slab 1). Note that neither the pointer slabs nor slabs[1] need to be concise, but they could be (with their own associated request identifiers for reconstructing the full address). From there, the slab is indexed by computing H2(request identifier), which yields the slot allocated to A, and then by applying the & operator, the address of the slot is obtained. Note that this example assumes that H2 knows the number of slots in slab 1 740 so that it produces a slot index in slab 1 740. In some implementations, H2 takes the slots in slab 1 740 or the slab ID as another input.

In at least one example, the memory allocation logic 104 passes the request identifier to H2 that is the virtual address of the concise pointer that references the root node A 702 (i.e., the full address or a subset of the full address of the tuple (1,2) in node A 705) since virtual addresses within a single address space are unique, and the request identifier size is typically fixed since the maximum virtual address space size is limited by hardware capability. By contrast, if non-unique request identifiers are used (e.g., the key values from data structures that store one or duplicate key values), then request identifiers with the same value hash to the same set of candidate slots, which is not desirable, given that it greatly increases the likelihood that no viable slot exists within the extant slabs as candidate slots become allocated and the pool of viable slots decreases.

The set of hash functions associated with slab 1 740 need not be the same as the set of hash functions associated with any of the other slabs (e.g., H2 for slab 1 740 need not be the same as H2 for slab 2 745). In some instances, the set is identical. In other instances, the set is partially overlapping or completely disjoint. In practice, there is good reason to have the hash functions with the same identifier be similar but not exactly the same. For instance, imagine slab 2 745 has 1000 slots and slab 3 750 has 500 slots, then hash functions that map an input request identifier to a candidate slot will likely be different (e.g., H2 for slab 2 745 outputs a number between 0 to 999 inclusive whereas H3 for slab 3 750 outputs a number between 0 to 499 inclusive). However, even though the hash functions will likely be different between slabs of different sizes, there can be substantial similarity. For example, in some instances, H2 for slab 2 745 can be implemented as f(request_identifier) mod 1000 and H2 for slab 3 750 can be implemented as f(request_identifier) mod 500, where f is a hash function that is common to both H2's and where the only difference is the modulo operation. Such an implementation has advantages in terms of code reuse and should accordingly improve instruction cache hit ratios versus having no commonality between hash functions across slabs.

Figure 8:
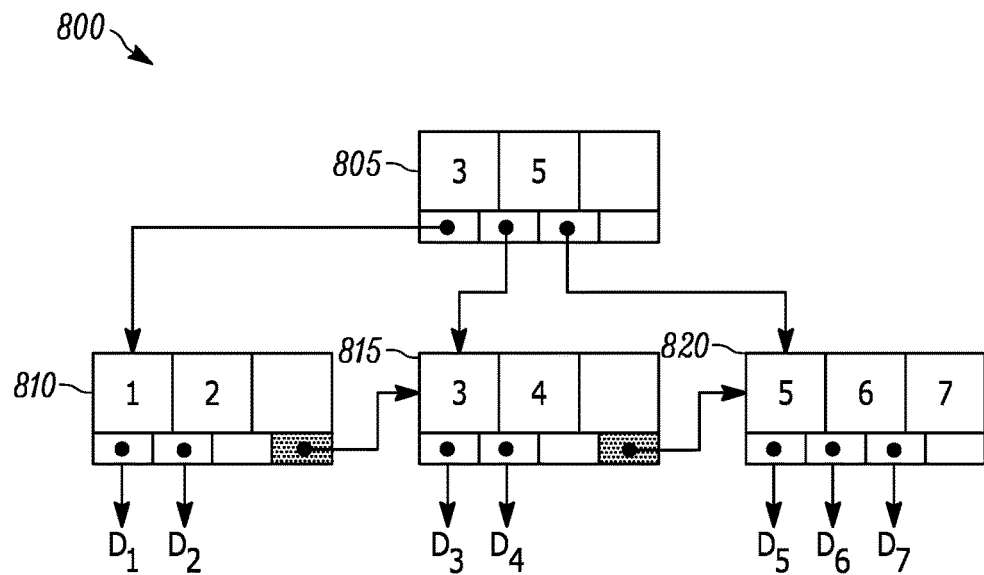
FIG. 8 illustrates another example of using the memory allocation logic and identifiers in accordance with one embodiment set forth in the disclosure.

FIG. 8 illustrates another example of using the memory allocation logic 104 and identifiers. For example, internal nodes 805 store keys and pointers to child nodes 810, 815, 820. Leaf nodes store keys and pointers to values (or keys and values). In the example, the leaf nodes 810, 815, and 820 are connected to one another as a linked list to speed up traversals. The B+ tree has a fanout (a.k.a. a branching factor) of 4. Typical B+ trees that have nodes sized to 4 KB memory pages often have fanouts of 100 to 200 and nodes that are sized to a 4 KB page.

For example, a B+ tree's fanout (i.e., the number of children that each node can have) is limited by the node size divided by the size of each key and pointer. Assuming that a reference B+ tree would employ eight byte keys, six byte pointers, and two bytes of metadata, for a 4 KB page, the fanout would be 256. However, if by reducing the pointer cost to two bytes via the above methods and device, then the fanout can be doubled to 512 (a 2× improvement over the prior art). With such a scheme, a tree of height H in this scheme can index $2^H$ more data than the baseline equivalent. For a tree of height 3, that corresponds to 8× more data. In some variations, the memory allocation logic 104 uses compression of the keys, values, and metadata that are layered on top of the methods described above for even greater improvements in fanout. Although prior work looks at improving the fanout of B+ trees using compression, often the level of compression is not uniform, which can create performance and storage anomalies due to variable branching factors. Since the above methods and devices bias toward using almost exclusively several of the many hash functions, the level of entropy in the hash function IDs is reliably low, and so compression ratios between nodes is relatively stable.

Figure 9:
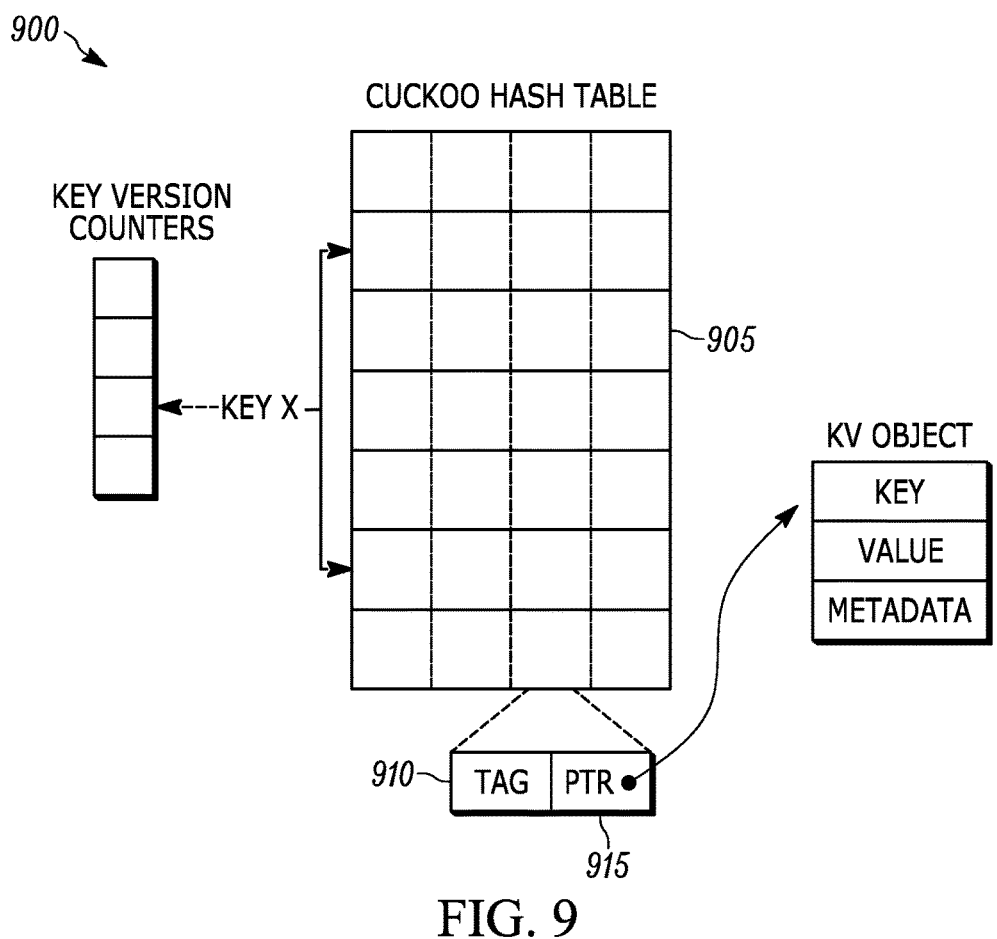
FIG. 9 illustrates yet another example of using the memory allocation logic and identifiers in accordance with one embodiment set forth in the disclosure.

FIG. 9 illustrates another example of using the memory allocation logic 104 and identifiers. For example, MemC3 900 is a more cache friendly alternative to the traditional MemCached and does away with using a chaining-based hash table implementation as its index for its key-value store. A hash table 905 is stored and includes entries 8-byte entries, which contain a one-byte tag 910 and seven bytes for identifying the slab and associated slot 915. The slot 915 stores the full key, value, and metadata. With the above methods and device, the size of the table (not the linked KV objects) is reduced by a factor of 2× to 4×. For example, the memory allocation logic 104 needs only use 8 bits for the tag 910 and 8 to 24 bits for the combined slab ID and hash function ID, for a total of 2 to 4 bytes, with only a few supported KV data sizes, 8 bits likely suffices for identifying the slot 915. However, with a large range of data sizes and many slabs, up to 24 bits may be used. With this reduction, the hash table has a greater likelihood of fitting in cache, and so the mean memory access time is likely to improve.

Short tags are used in lieu of storing keys in the hash table. The pointer (shown as "ptr") points to a variable sized object. While MemC3 uses a slab allocator, their pointers are explicit. Further, a reduction of these pointers down to one byte in size reduces the table memory use by 50% to 75%.

Also, integrated circuit fabrication systems (e.g., wafer fabrication systems) are known that create wafers with integrated circuits based on executable instructions stored on a computer readable medium such as but not limited to CDROM, RAM, other forms of ROM, hard drives, distributed memory, etc. are produced by an integrated circuit design system (e.g., work station). The instructions are represented by any suitable language such as but not limited to hardware descriptor language (HDL), Verilog or other suitable language. As such, the logic and circuits described herein are also produced as integrated circuits by such fabrication systems using the non-transitory computer readable medium with instructions stored therein. For example, an integrated circuit with the logic and structure described above is created using such integrated circuit fabrication systems. The computer readable medium stores instructions executable by one or more integrated circuit design systems that causes the one or more integrated circuit design systems to fabricate an integrated circuit. For example, the designed integrated circuit includes memory allocation logic 104. Further, in some implementations, the integrated circuit generates a slab identifier and a hash function identifier in response to a memory allocation request from a memory allocation requestor 102. The slab identifier indicates a memory region associated with a base data size. The hash function identifier indicates a hash function. Further, the integrated circuit provides, to the memory allocation requestor 102, a bit string including the slab identifier and the hash function identifier. In some implementations, the fabricated integrated circuit also includes other aspects described herein, such as aspects described in FIGS. 3, 4, 5, 6, 7, 8, and/or 9.

Among other technical benefits, some implementations of the methods and device described above allow for reducing the memory size (and hence space cost) for storing linked data structures (e.g., it is not uncommon to achieve net 2× to 4× reductions in space usage [memory identifiers+other data]), where the amount of data required to store the memory identifiers is a significant portion of the total space cost. With a smaller memory footprint, this optimization can improve cache hit ratios and throughput metrics like instruction per cycle.

Further, some implementations of the methods and device described above allow for reducing the depth of some tree-based data structures (e.g., reduce from 4 levels to 3), which saves round-trips to memory when locality is poor. By having a smaller alternative to traditional pointers, data structures like B+ trees and radix trees, which pack many pointers into a single node (often sized to a physical memory page), can increase their fanout (e.g., how many direct children a node can point to in a B+ tree). With a larger fanout, the height of the tree can be reduced, and so it takes fewer memory accesses to traverse from the root to the leaf. Further, problems associated with traversing pointers in linked data structures like translation lookaside buffer (TLB) misses, page faults, and branch mispredictions should be reduced (at least at a per lookup/update granularity). This optimization can be used to reduce how many levels there are in a radix-tree-based page table (albeit with hardware modifications to TLBs and MMUs). Applying the technology to an X86-based instruction set architecture could reduce the depth of the page tables from 4 to 3 for 48- to 52-bit virtual address spaces while still using a radix tree.

Additionally, some implementations described above allow for increasing the scalability of the memory allocator by permitting high a degree of concurrency. Traditional memory allocators maintain large free lists and coarse-grain regions that are inherently serial. Adding multiple free lists for a specific granularity of object improves scalability but not to the extent that would be necessary for a GPU that does its own high-performance memory allocation. Individual free lists remain serial. The above methods and device do not have this problem, as many thousands of writers can modify the same slab at a time with low probability of conflicts. For the conflicts that do manifest, they can be easily resolved via optimizations.

Also, some implementations described above allow for selecting the data chunk to allocate scale well to single instruction, multiple data (SIMD) and/or single instruction, multiple thread (SIMT) microarchitectures, which is key to make them fast on modern hardware. Further, some implementations (e.g., by using bit vectors and/or other performance optimizations described above) allow for an optimized lock-free implementation (e.g., a failure or suspension of any thread cannot cause failure or suspension of another thread and there is guaranteed system-wide progress). By using a lock-free implementation, the methods and device increase the amount of time spent in parallel execution rather than serial execution, improving performance on a multi-core processor.

The above detailed description of the present disclosure and the examples described therein have been presented for the purposes of illustration and description only and not by limitation. It is therefore contemplated that the present disclosure covers any and all modifications, variations or equivalents that fall within the scope of the basic underlying principles disclosed above and claimed herein.

What is claimed is:

1. A device comprising:
a memory comprising a memory region,
a memory allocation requestor configured to:
generate a memory allocation request, and
store data in the memory region,
a memory allocation logic configured to: in response to a memory allocation request from the memory allocation requestor,
generate a slab identifier and a hash function identifier indicating a hash function, wherein the slab identifier indicates the memory region associated with a base data size, and
provide, to the memory allocation requestor, a bit string comprising the slab identifier and the hash function identifier.

2. The device of claim 1, wherein the memory is a system memory.

3. The device of claim 1, wherein the memory allocation logic generates the slab identifier and the hash function identifier by:
generating a concatenated tuple comprising the slab identifier and the hash function identifier.

4. The device of claim 1, wherein the memory allocation request comprises the base data size and a request identifier, and wherein the memory allocation logic generates the slab identifier and the hash function identifier by:
generating the hash function identifier based on the request identifier corresponding to the memory allocation request; and
generating the slab identifier based on the base data size.

5. The device of claim 4, wherein:
the request identifier comprises a virtual memory address; and
the memory allocation logic generates the hash function identifier based on the virtual memory address.

6. The device of claim 4, wherein:
the request identifier comprises a physical memory address; and
the memory allocation logic generates the hash function identifier based on the physical memory address.

7. The device of claim 4, wherein the memory allocation logic is further configured to:
based on comparing slab metadata corresponding to a plurality of slabs with the base data size, determine a subset of the plurality of slabs corresponding to the base data size, wherein each of the plurality of slabs indicates a distinct memory region; and
select, from the subset of the plurality of slabs, a memory location to store data corresponding to the memory allocation request, wherein the generating the slab identifier and the hash function identifier is based on the memory location.

8. The device of claim 7, wherein the memory allocation logic is further configured to:
determine, based on the request identifier and a plurality of hash functions, a plurality of candidate slots from the subset of the plurality of slabs, wherein the selecting the memory location is based on the plurality of candidate slots.

9. The device of claim 8, wherein the memory allocation logic is further configured to:
determine, based on the plurality of candidate slots, a viable candidate slot indicating the memory location; and
store the data in the memory location.

10. The device of claim 9, wherein the memory allocation logic is further configured to:
determine a bit vector corresponding to the plurality of candidate slots within the subset of the plurality of slabs; and
determine, based on performing an operation on the bit vector, the viable candidate slot.

11. The device of claim 10, wherein the memory allocation logic performs the operation on the bit vector by performing an atomic operation on the bit vector.

12. The device of claim 10 wherein the memory allocation logic performs the operation on the bit vector by performing a read operation on the bit vector, a set operation on the bit vector, and an update operation on the bit vector.

13. The device of claim 10, wherein the memory allocation logic is further configured to:
perform an atomic update operation to update the bit vector based on storing the data in the memory location.

14. The device of claim 13, wherein the memory allocation logic performs the atomic update operation to update the bit vector by performing an atomic OR operation.

15. The device of claim 13, wherein the memory allocation logic performs the atomic update operation to update the bit vector by performing an atomic Compare-and-Exchange operation.

16. The device of claim 1, wherein the memory allocation logic is further configured to:
retrieve data corresponding to the memory allocation request based on the slab identifier and the hash function identifier.

17. A method for implementing memory allocation comprising:
generating a memory allocation request by a memory allocation requestor;
in response to the memory allocation request from the memory allocation requestor,
generating a slab identifier and a hash function identifier indicating a hash function, wherein the slab identifier indicates a memory region associated with a base data size, and
providing, to the memory allocation requestor, a bit string comprising the slab identifier and the hash function identifier.

18. The method of claim 17 wherein generating the slab identifier and the hash function identifier comprises:
generating a concatenated tuple comprising the slab identifier and the hash function identifier and wherein the respective processor memory is configured as cache memory.

19. The method of claim 17, wherein the memory allocation request comprises the base data size and a request identifier, and wherein the memory allocation logic generates the slab identifier and the hash function identifier by:
generating the hash function identifier based on the request identifier corresponding to the memory allocation request; and
generating the slab identifier based on the base data size.

20. The method of claim 19, wherein:
the request identifier comprises a virtual memory address; and
the generating the hash function identifier is based on the virtual memory address.

* * * * *